Feb. 25, 1969
HUGH L. DRYDEN
DEPUTY ADMINISTRATOR OF THE NATIONAL
AERONAUTICS AND SPACE ADMINISTRATION
SYSTEM FOR MONITORING THE PRESENCE OF NEUTRALS
IN A STREAM OF IONS
Filed Sept. 1, 1965
3,430,131
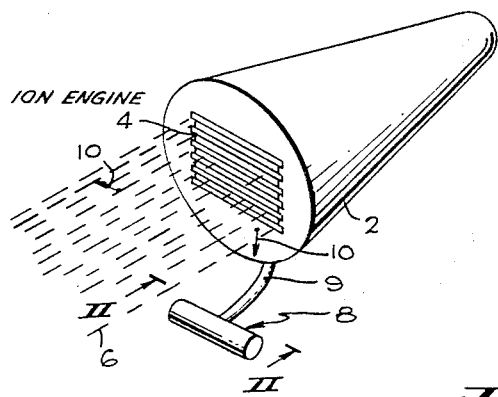
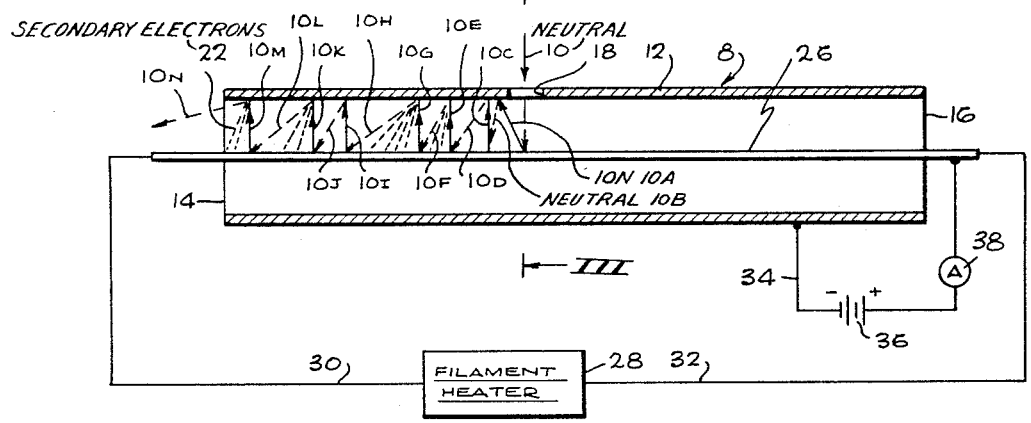
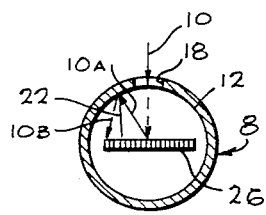
KENNETH R. PINCKNEY
BRIAN DEL CURTO
INVENTORS
BY
Howard B. Scheckman
ATTORNEYS

United States Patent Office 3,430,131
Patented Feb. 25, 1969

3,430,131
SYSTEM FOR MONITORING THE PRESENCE OF NEUTRALS IN A STREAM OF IONS
Hugh L. Dryden, Deputy Administrator of the National Aeronautics and Space Administration with respect to an invention of Kenneth R. Pinckney, Long Beach, and Brian Del Curto, Santa Monica, Calif.
Filed Sept. 1, 1965, Ser. No. 484,490
U.S. Cl. 324—33               7 Claims
Int. Cl. G01n 27/62

ABSTRACT OF THE DISCLOSURE

This device can be used to detect the number of neutrals or atoms in an ion stream. It produces much larger signals than could be previously obtained. A hollow cylindrical collector is provided that is made of a material providing high secondary electron emission. It contains an entrance aperture in its surface, and carries a heated filament generally along its longitudinal axis. The collector is biased negative relative to the filament. An atom enters through the aperture, strikes the filament and is ionized. The ion is then repelled by the positive bias on the filament and impinges on the collector, knocking off electrons. It then becomes a neutral. The collector is heated so as to boil off the neutrals, which drift until they once again hit the filament to repeat the process.

Origin of invention

The invention described herein was made in the performance of work under a NASA contract and is subject to the provisions of Section 305 of the National Aeronautics and Space Act of 1958, Public Law 84–568 (72 Statute 435; 42 USC 2457).

Background of the invention

This invention relates to a neutral detector and more particularly to a device that can be used in detecting the number of neutrals or atoms in an ion stream.

One important way of determining how efficiently an ion engine is operating is to measure the neutral efflux, or number of neutrals in the ion stream. Neutrals are atoms that the ion engine has failed to change into ions. Since atoms are neutral, they are unaffected by the accelerating voltage of the ion engine. They cannot be accelerated as are ions to add thrust to the ion engine. Essentially the larger the number of neutrals in the ion stream the less efficient is the operation of the ion engine. This would be analagous to unburned gas going out the tail pipe of a car. The quantity of neutrals in the ion stream can therefore be used as an indicator of how efficiently the ion engine is operating.

In line with the above, it is therefore desirable to be able to know the quantity of neutrals being produced by the ion engine to determine its efficiency of operation. Once this is known, the operating parameters of the ion engine can be changed, if necessary, to make the engine operate in its most efficient manner.

Essentially the way the quantity of neutrals have been measured in the prior art, was to convert the neutrals into ions. In the process there is a transfer of an electron for each neutral. This transfer of electrons produces a signal current that can be measured.

However, one of the drawbacks in determining the neutrals in the ion efflux is the extremely small DC signal currents that have to be measured (in the order of $10^{-7}$ to $10^{-9}$ amps). It is necessary to use micro-micro ammeters to measure these small currents. Working with such small currents is a problem. While measurement of very small signal currents can be made in a laboratory, it is very difficult to use the type of equipment required to do this on satellites flying through space and to transmit this information back to the ground.

It can be seen therefore that with respect to satellites, for example, that it would be very desirable to have working signal currents that are many magnitudes greater than the presently available signal currents. Larger signal currents would permit more accurate and easier monitoring of the ion engine.

Summary of the invention

With the above problems in mind, it is an object of this invention to teach how to construct a high gain neutral detection system that provides larger working signal currents than could be previously obtained.

It is also an object of this invention to provide a neutral detector to monitor an ion engine that will generate much greater signal currents than could be done previously to facilitate more accurate ion engine control.

Essentially, as taught by this invention, a detector is positioned to intercept some of the neutrals from the ion stream. The detector then operates to form the neutrals into ions as done previously so they will generate a signal current. It then operates to alternately neutralize and ionize the same neutral so as to multiply the current that the neutral can produce. In addition, the neutral when formed into an ion is made to produce secondary electrons to further increase the measurable current.

The detector includes a hollow cylindrical collector electrode having open ends, and an aperture in its surface for passage of neutrals to its interior. Within the cylinder is a filament electrode positioned along the cylinder's longitudinal axis.

A bias circuit, including a source of DC bias voltage, is connected between the collector and filament. It operates to bias the collection negative so it will attract ions, while the filament is biased positive so it will repel ions. Means to indicate the amount of current flowing between the collector and filament is provided in the bias circuit.

A heater is provided to heat the filament to a temperature that will ionize neutrals impinging on it. Neutrals enter through the aperture in the collector, impinge on the heated tungsten filament and become ionized. Once ionized, the ions are drawn by the high negative voltage on the collector to impinge on it and become neutralized. The collector is made of material that will yield secondary electrons when the ion impinges on the collector. These secondary electrons are attracted by the high positive voltage of the filament. To put the neutral back into circulation, the collector is heated by radiation from the filament and is caused to boil off ions that have impinged on it and that become neutrals again. Once these neutrals are boiled off from the collector they are once again free to impinge on the filament and again become ionized. The process is repeated over and over until the neutral finally diffuses out of the detector.

Electron flow between the collector and filament resulting from secondary electron emission, and the alternate forming of ions and neutralizing of the ions appears as an output signal current between the collector and filament much higher than could be previously obtained.

The amount of current flowing between the collector and filament is directly related to the collision rate of the ions and neutrals occurring between the collector and filament electrodes. This can be directly correlated to the number of neutrals in the ion stream. That is, the greater the signal current, the greater the number of neutrals in the ion stream.

With the above detection system, the output current is increased several magnitudes and therefore provides for more accurate monitoring of the ion engine. It also permits use of less delicate instruments to measure the current flow, so instruments that are more suitable for space flight may be used.

Brief description of the drawings

Other objects and advantages will appear from the following description considered in conjunction with the accompanying drawings wherein:

FIG. 1 shows a satellite utilizing an ion engine for propulsion and illustrates the location and use of the neutral detector of this invention;

FIG. 2 is a longitudinal sectional view of the neutral detector of FIG. 1 taken in the direction of arrows II—II showing the collector, filament, and the paths of neutrals and ions; and FIG. 3 is a view of FIG. 2 taken in the direction of arrows III—III showing a cross section of the detector.

Description of the preferred embodiment

Referring to FIG. 1 there is shown a satellite 2 that may utilize an ion engine 4 for purposes of propulsion, or for positioning of the satellite.

The ion engine emits a stream of ions 6 as the propulsion fluid. Carried by the satellite to monitor the ion engine is neutral detector 8. It is connected to the side of the satellite by support 9. Neutral detector 8 is positioned to one side of ion stream 6 so that it is not in the path of the ions. Ion engine 4 functions to focus and columnate the ions to provide a stream that diverges at an extremely narrow angle so that there is little danger of the ions impinging on the detector.

The paths of ions can be closely controlled by the accelerating and focusing voltages of the ion engine. However, neutrals 10 that are entrained in the ion stream, cannot be controlled by the voltages of the ion engine. These neutrals 10 therefore can fly off in all directions, depending on their velocity and the direction of issue from the ion stream. The neutral detector is positioned on the edge of the ion stream with its longitudinal axis crosswise to the path of said ion stream. It is positioned so as to intercept some of these neutrals to provide an indication of the number of neutrals in the ion stream and, in turn, the efficiency of operation of the ion engine.

Referring to FIG. 2, there is shown a longitudinal sectional view of neutral detector 8. Essentially, it includes a collector electrode 12 that is cylindrical in shape. The collector is made hollow and is open at both exit ends 14, 16. Midway between ends 14, 16 of the collector there is provided an aperture 18 for the entrance of neutrals 10. The collector is also made of material that will yield a high secondary electron emission cross section 22 when an ion impinges on it. Where the ion expellant material of the ion engine is cesium, the collector may be made of nickel for example.

Positioned in the center of the collector is a filament electrode 26 in the form of a ribbon. The filament extends along the longitudinal length of cylindrical collector 12 and is positioned essentially at its longitudinal axis. The collector is made cylindrical so as to form a closed geometry around filament 26 (FIG. 3). This is to facilitate multiple collisions of the neutrals and ions with the collector and the filament. Where the ion expellant material is cesium, the filament may be made of tungsten for example.

Filament 26 is heated by means in the form of a filament heater 28 that is connected, by means in the form of conductors 30, 32, to each end of the filament. Filament heater 28 also serves as means to heat collector 12. This is done by heating the filament to a temperature that is sufficiently high to radiate heat to the collector so as to heat it by radiation. Where the filament is tungsten and the collector is nickel the filament is heated to approximately 1500° C. so as to heat the collector by radiation to between approximately 500°–800° C. This will make the collector hot enough to boil off cesium neutrals formed from ions that impinge on its surface as will be explained later. If the collector is heated much above 800° C., then thermionic emission creates "noise" that interferes with the signal current readings, while below 500° C. the collector will not be hot enough to boil off the cesium neutrals.

A bias circuit 34, including a DC voltage source 36, having its negative terminal connected to collector 12 and its positive terminal connected to filament 26, provides the bias voltages on the collector and filament electrodes.

Connected in series in bias circuit 34 is means to measure the current flow between the collector and filament, and is shown as an ammeter 38. It will be apparent that the output from the ammeter can be converted to either a digital or analog output and transmitted to a receiving station on earth that is monitoring the ion engine, or the output can be used to control the engine directly.

Operation

To aid in explaining the operation of the detector, there is shown in FIG. 2 the path that a neutral 10 might take in moving through the detector. The dotted lines indicate the path of the neutral, and the solid lines the path of the ion formed from the neutral.

Neutral 10 enters the detector through aperture 18 in collector 12 and impinges on filament 26 that is heated by heater 28. Filament 26 ionizes neutral 10 and converts it into an ion 10A. The resultant ion 10A is repelled by the high positive bias voltage on the filament from DC source 36 and attracted by the high negative bias voltage on collector 12. It is caused to accelerate and impinge on the collector surface. When the ion impinges on the collector, it knocks off a number of secondary electrons 22. These in turn are drawn to filament 26 by the positive voltage on it.

When ion 10A impinges on the collector it will receive an electron so it becomes once again a neutral, and will no longer be affected by the voltage on the collector. However, radiation from filament 26 heats collector 12 to a high temperature that in turn will boil off the former ion 10A that has now become a neutral again. This neutral is now illustrated by numeral 10B. Boiled off neutral 10B is now free to drift in the space between the collector and filament until it again impinges on filament 26 where it will once again become ionized to form an ion 10C. Ion 10C will once again be drawn to impinge on collector 12 where it will again knock off a quantity of secondary electrons 22 and become neutralized to form neutral 10D. This alternate ionizing and neutralizing is shown by numerals 10A–10N to show the path of neutral 10 through the detector. This process will repeat itself until the neutral (10N) eventually diffuses out through exit 14 in the detector. The neutral diffuses toward exit 14 because there is less pressure at the ends of the cylinder exposed to the vacuum of space. While only the path of one neutral passing through detector 8 is illustrated in FIG. 2, it will be apparent that there will be a continuous stream of neutrals 10 entering through aperture 18, while other neutrals will be diffusing out through both exits 14, 16 of the detector.

While the number of neutrals in the ion stream can be accurately estimated from the amount of current flow, it is noted that in monitoring an ion engine it is not necessary to know the number of neutrals in the ion stream. It is sufficient to compare the magnitude of signal currents generated during operation of the ion engine and select the mode of operation that produces the smallest signal current. This would indicate the least neutrals in the ion stream and most efficient operation.

In summary, the collector and filament cooperate to alternately form ions and neutralize them so there will be repeated impingements of the neutral with the filament and the ion with the collector. There will also be a large secondary electron emission everytime an ion impinges on the collector. This will continue until the neutral diffuses out of the end of the detector. The repeated transfer of electrons due to changing ions to neutrals and back again, and the secondary electron emission, will increase the measureable current resulting from the total of these impingements to provide a much larger indication of signal current.

It will be understood by those skilled in the art that other materials and temperatures can be used in the detector, depending on the type of ion expellant from the ion engine. It is also apparent that while the detector is described as being used with an ion engine, that its use is not so limited. The detector may be used with other types of plasma accelerators for example, as will suggest themselves to those skilled in the art. Also, various modifications may be made by those skilled in the art without departing from the spirit and scope of the invention herein defined by the appended claims.

What we claim is:

1. In a detector for measuring the presence of neutrals in an efflux of ions, the combination comprising:
   first means to intercept and change neutrals present in said efflux of ions into ions, and thereafter repel the ions formed thereby;
   second means substantially surrounding said first means and spaced therefrom, positioned in the path of the ions formed by said first means to intercept them and convert them back to neutrals;
   means for heating said second means to cause it to free neutrals formed thereby, at least some of the freed neutrals impinging on said first means to be converted into ions; and
   means connected between said first and second means to provide a current signal whose magnitude is related to the amount of neutrals in said efflux of ions.

2. A device, as set forth in claim 1, wherein said first means comprises an elongated filament and said second means comprises a substantially hollow cylindrical collector defining an aperture for entrance of neutrals thereinto, said collector encircling said filament to form a substantially closed geometry around said filament which intercepts neutrals in said efflux of ions entering said collector through its aperture and intercepts neutrals freed by said collector for converting them into ions.

3. A device, as set forth in claim 2, wherein means are provided to heat said collector to cause it to boil off neutrals that are formed from ions that impinge on it, to free said neutrals for further impingements on said filament.

4. In a detector for monitoring the presence of neutrals in an efflux of ions, the combination comprising:
   a filament positioned to intercept neutrals in said ions efflux and form them into ions;
   means to provide a positive voltage on said filament to cause it to repel the ions formed thereby;
   a collector to convert the ions formed by said filament into neutrals;
   means to provide a negative voltage on said collector to attract the ions formed by said filament;
   said collector being spaced from said filament and constructed to form a substantially closed geometry around said filament and positioned to be impinged by ions formed by said filament to change them into neutrals, said collector being made of material that yields high secondary electron emission when said ions impinge thereon;
   means for heating said collector to cause it to boil off neutrals, formed thereby which are free to propagate to and impinge on said filament whereat they are ionized and repelled therefrom toward said collector; and
   means to indicate the amount of current flowing between said filament and collector the amount of current being indicative of the presence of neutrals in said efflux of ions.

5. A device as set forth in claim 4 wherein said means to heat said collector is constructed to heat said filament directly and in turn to heat said collector by radiation from said filament.

6. In a detector carried by a satellite, for measuring neutrals in an efflux of ions generated by an ion engine, the improvement comprising:
   a support;
   a collector, carried by said support, said collector being made of material that can change ions to neutrals, said collector being a hollow cylinder with open ends, and containing an aperture in its surface between its ends for passage of neutrals to the interior of said cylinder, said cylinder being positioned with its longitudinal axis crosswise to the path of said efflux of ions, with said aperture positioned to permit entrance of neutrals;
   a filament, said filament being made of material that will ionize said neutrals, and said filament being positioned in the center of and extending the length of said cylinder, to be in the path of neutrals passing through said aperture in said cylinder;
   a source of DC voltage;
   means to connect said collector to the negative side of said source of voltage so it will attract ions;
   means to connect said filament to the positive side of said source of voltage so it will repel ions;
   means to heat said filament to a temperature that can ionize neutrals impinging on said filament, and to heat said collector by radiation from said filament to a temperature that will form neutrals out of ions that impinge on it and will boil off the resulting neutrals so they are once again free to impinge on said filament and again become ionized, said collector and filament cooperating to alternately change said neutrals to ions and then back again until they diffuse out of the open end of said collector so as to increase the measurable current resulting from said impingements; and
   means connected between said collector and filament to indicate the amount of current flowing between them.

7. A device as set forth in claim 6 wherein said collector is made of material that produces secondary electrons when an ion impinges on it.

References Cited

UNITED STATES PATENTS

| | | | |
|---|---|---|---|
| 1,914,883 | 6/1933 | Cottrell | 324—33 X |
| 2,375,280 | 5/1945 | Calbick | 324—33 X |
| 2,653,620 | 9/1953 | Morgan | 324—33 X |
| 2,750,560 | 6/1956 | Miles | 324—33 |
| 2,808,510 | 10/1957 | Norton | 331—3 |
| 3,258,713 | 6/1966 | George. | |

RUDOLPH V. ROLINEC, *Primary Examiner.*

C. F. ROBERTS, *Assistant Examiner.*

U.S. Cl. X.R.

250—41.3; 315—111; 331—3